Nov. 20, 1934. J. G. SHODRON 1,981,434
APPARATUS FOR STORAGE AND VENTILATION OF HAY
Filed Jan. 7, 1933 4 Sheets-Sheet 2
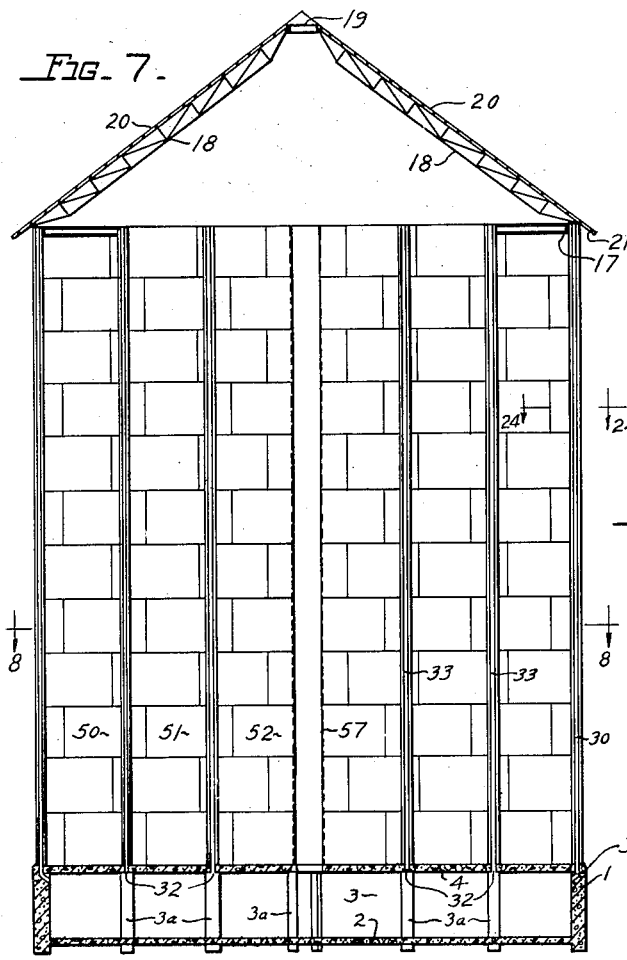
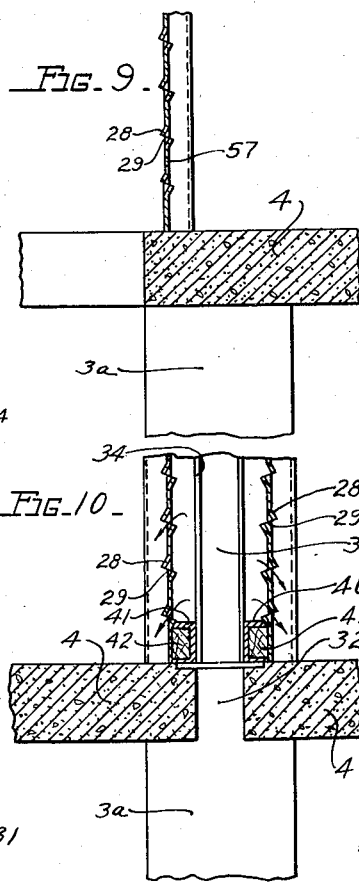
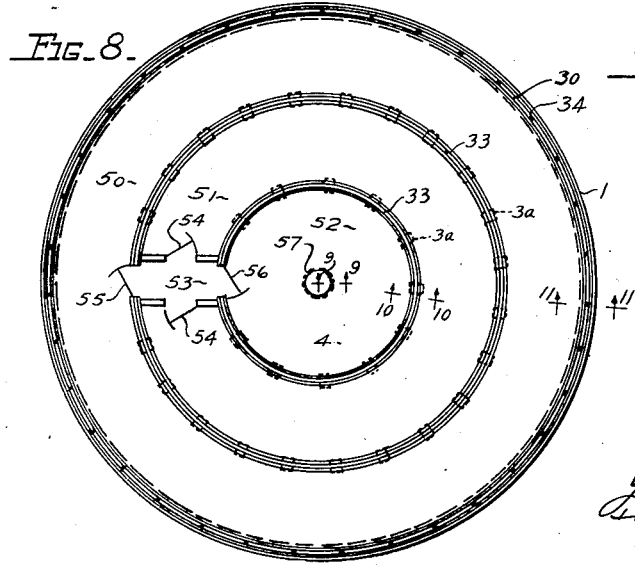
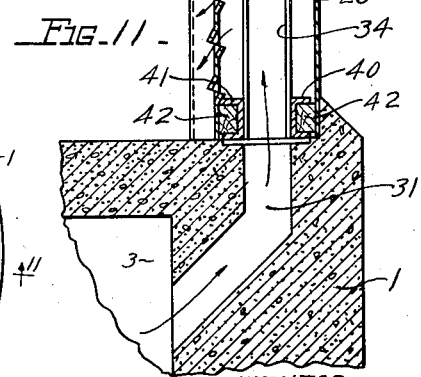

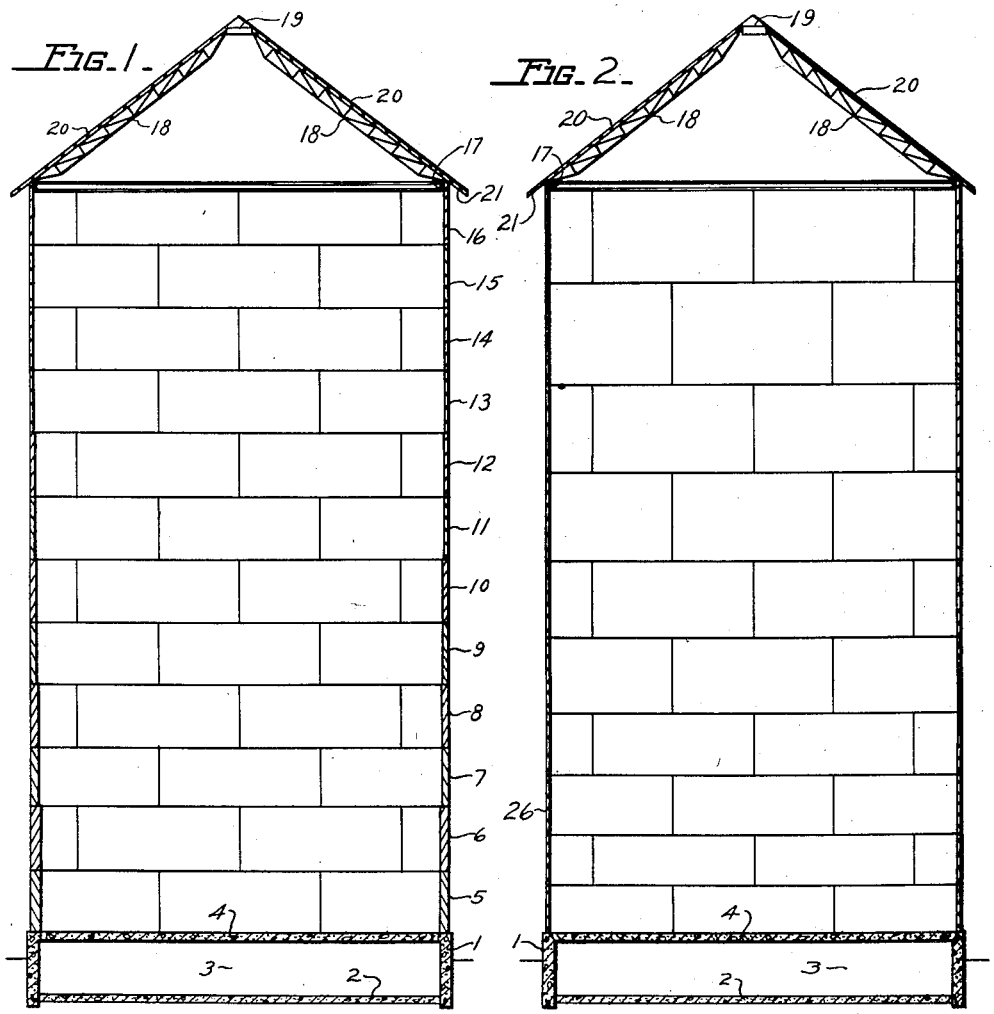
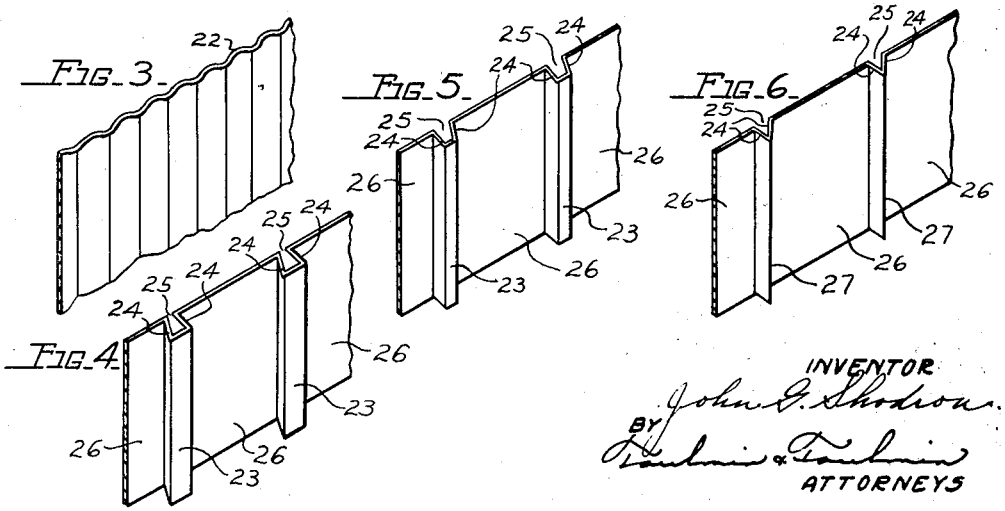

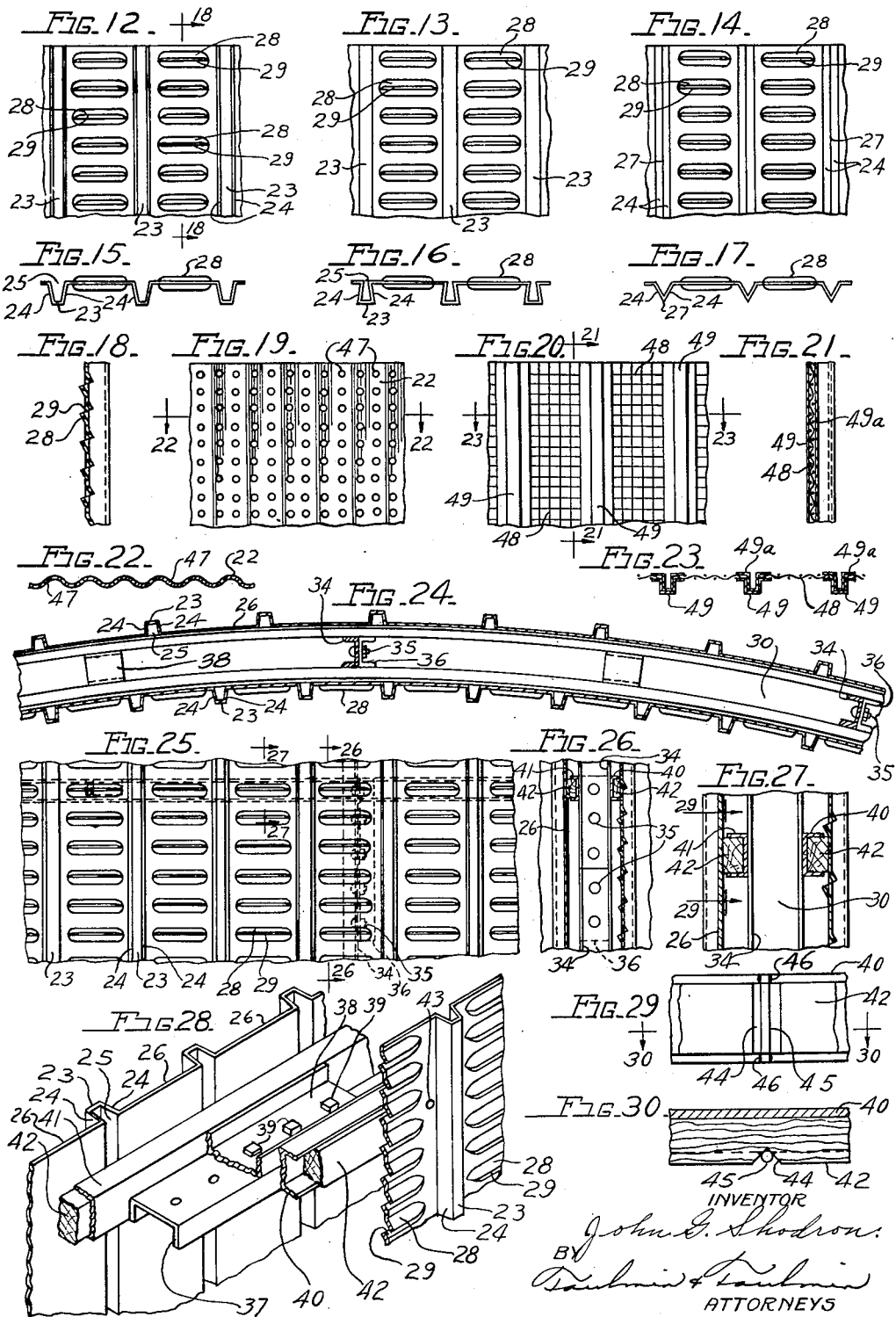

Nov. 20, 1934.  J. G. SHODRON  1,981,434
APPARATUS FOR STORAGE AND VENTILATION OF HAY
Filed Jan. 7, 1933  4 Sheets-Sheet 4
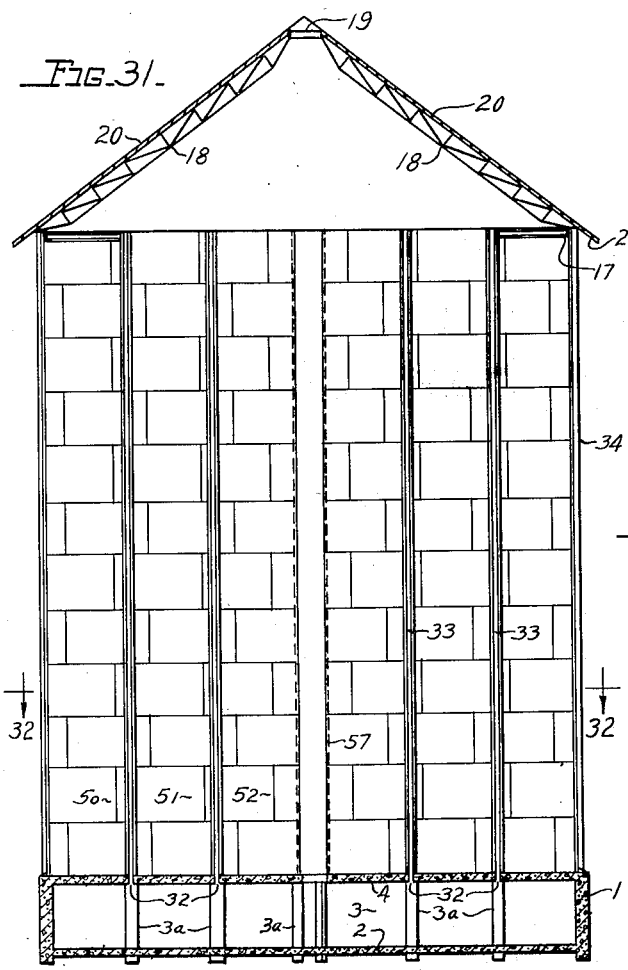
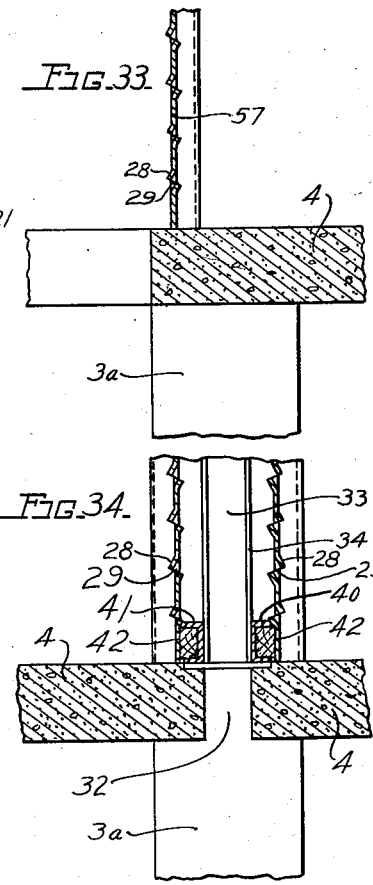
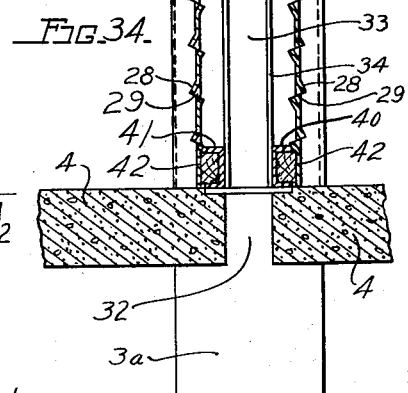
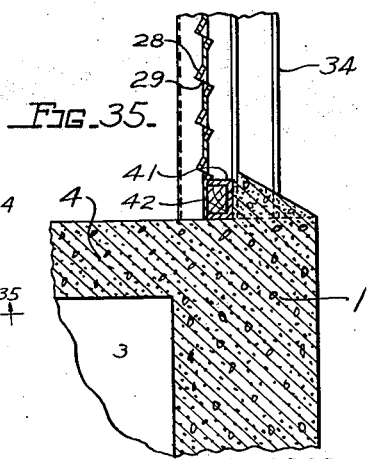
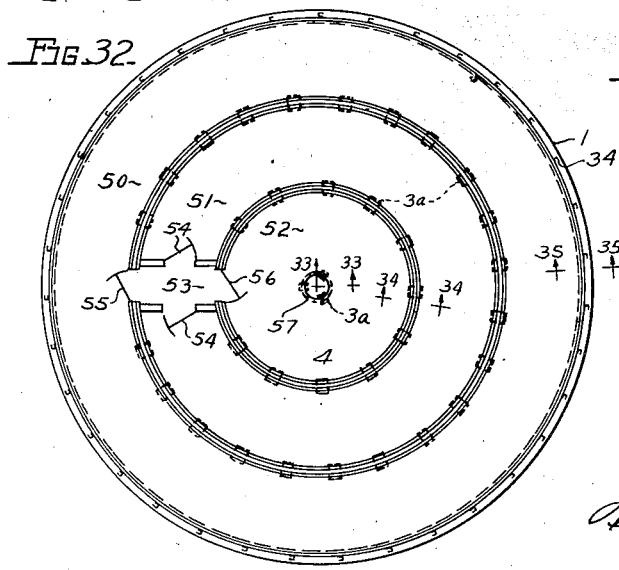
INVENTOR
John G. Shodron
BY
ATTORNEYS Patented Nov. 20, 1934

1,981,434

UNITED STATES PATENT OFFICE 1,981,434

APPARATUS FOR STORAGE AND VENTILATION OF HAY

John G. Shodron, Fort Atkinson, Wis., assignor to James Manufacturing Company, Fort Atkinson, Wis., a corporation of Wisconsin Application January 7, 1933, Serial No. 650,731

5 Claims. (Cl. 98—55)

My invention relates to storage containers for hay.

It is the object of my invention to provide storage containers for hay in order to ventilate the hay from top to bottom and from side to side throughout the entire mass of hay.

It is my particular object to provide methods and means of fabrication of the parts for forming the ventilated walls of the hay container while using metal sections of the minimum thickness.

It is my object to provide means and method of erection of segmental steel walls used for forming ventilated containers for hay and the like.

It is a further object of my invention to provide a plurality of sectional steel members of varying thickness in order to adapt the strength of the container through the amount of material it would have to contain and resist.

It is a further object to provide a system of metal forms and wooden fillers by which it is possible to erect a structural frame work and attach the sheathing thereto with a minimum of bolting or welding.

It is a further object to provide a series of segmental ventilating sheets which, in combination with segmental exterior sheets and the structural frame work, together form a combination sufficiently strong to carry the stresses and loads of the hay container without unduly multiplying the weight of the metal employed.

It is a further object to provide a container having a truss roof section so that the roof may be supported from the side walls of the container while leaving the interior of the roof entirely free over the container so that hay, such as chopped hay and the like, may be delivered through the roof of the container without interference by roof supports.

It is a further object to provide self-cleaning spaces between the walls of the container and the perforated walls.

My invention comprehends the accomplishment of its objects by any one of three major methods. The first system is the use of equal spans from girt to girt but varying the thickness of the sheet to meet the pressure requirements of the contents of the container. The second system utilizes sheets of the same thickness but varies the span from girt to girt to meet the varying stresses. The third system involves varying the depth of the ribs pressed into the varying sheets to give additional strength to the action exerted by the pressure of the stored crops. This third system can be used in combination with the first and second systems.

It is a further object to provide a roof for this structure of light structural truss rafters which rest with their lower ends against a heavy ring channel plate to restrain with their outward thrust the upper end frames fitting into an annular ring or collar and flat corrugated or rib sheets clipped to these truss rafters.

Referring to the drawings:

Figure 1 is a vertical section through the container having sectional walls of varying thickness from the bottom to the top;

Figure 2 is a section through the container having walls of the same thickness but formed of sections of unequal depth, the greater depth of the sections being towards the top;

Figure 3 is a perspective of a portion of the wall of the container in corrugated form;

Figure 4 is a portion showing the reinforcing ribs;

Figure 5 is a view showing another form of rib;

Figure 6 is a view showing a different type of reinforcing rib;

Figure 7 is a section through a container provided with a plurality of foraminous walls spaced from the continuous exterior walls and continuous interior walls in order to form ventilating passageways connected by self-cleaning openings to the plenum chamber in the foundation of the structure;

Figure 8 is a section on the line 8—8 of Figure 7;

Figure 9 is a section on the line 9—9 of Figure 8;

Figure 10 is a section on the line 10—10 of Figure 8;

Figure 11 is a section on the line 11—11 of Figure 8;

Figure 12 is a detail elevation of one form of the reinforcing foraminous wall having reinforcing ribs;

Figure 13 is a similar view of a modified form of such foraminous wall;

Figure 14 is a similar view of a still further modification of this foraminous wall;

Figure 15 is a top plan view of Figure 12;

Figure 16 is a top plan view of Figure 13;

Figure 17 is a top plan view of Figure 14;

Figure 18 is a section on the line 18—18 of Figure 12;

Figure 19 is a side elevation of a portion of a modified form of foraminous wall;

Figure 20 is an elevation of a woven wire metal reinforcing rib type of reinforcing wall;

Figure 21 is a section on the line 21—21 of Figure 20;

Figure 22 is a section on the line 22—22 of Figure 19;

Figure 23 is a section on the line 23—23 of Figure 20;

Figure 24 is a horizontal section on the line 24—24 of Figure 7 showing the arrangement of inner and outer or continuous and foraminous spaced walls and showing a portion of the container structure separated by vertical load carrying members, such as channels, and the annular girts and annular spacers;

Figure 25 is a front elevation in detail of the construction shown in Figure 24 looking from the inside of the structure;

Figure 26 is a section on the line 26—26 of Figure 25;

Figure 27 is a section on the line 27—27 of Figure 25;

Figure 28 is a perspective of the inside of the outer wall of the wooden outer filler partially broken away, the outer channel girt broken away, the annular spacer, the connecting plate for the annular spacers broken away, the inner girt and inner wooden filler broken away and a portion of the inside spaced foraminous wall showing the built-up construction of the wall of the container;

Figure 29 is a section on the line 29—29 of Figure 27;

Figure 30 is a section on the line 30—30 of Figure 29;

Figure 31 is a vertical section through the container when it employs a single outside wall and all of the walls are of foraminous character;

Figure 32 is a section on the line 32—32 of Figure 31;

Figure 33 is a section on the line 33—33 of Figure 32;

Figure 34 is a section on the line 34—34 of Figure 32;

Figure 35 is a section on the line 35—35 of Figure 32.

Referring to the drawings in detail, Figure 1 shows the construction having annular sections of outer wall of equal height but of unequal thickness, but has omitted from the showing of the drawings the inner spaced foraminous walls, which are shown in greater detail in connection with the other figures, but it will be understood that the inner foraminous wall is mounted in order to provide a ventilating arrangement for the contents of the container, such as chopped hay.

The foundation comprises an annular wall 1, a cellar floor 2 forming the bottom of the chamber 3 which is covered by the floor 4 upon which rests the lower annular section 5 and on which is mounted a plurality of annular sections of decreasing thickness, such as 6, 7, 8, 9, 10, 11, 12, 13, 14, 15 and 16. Sections 5 and 6 are of the same thickness, that is, 20-gauge metal; sections 7 and 8 are of 22-gauge metal; sections 9 and 10 are of 24-gauge metal; sections 11 and 12 are of 25-gauge metal; sections 13 and 14 are of 26-gauge metal, as are also sections 15 and 16. These annular sections may be divided in any number of segments of a circle.

The uppermost section 16 is provided with a ring 17 for receiving the light truss girders comprising the trusses 18, the upper ends of which engage a ring 19. Grooved sheets 20 are clipped or bolted or welded to the upper surfaces of these girders and overlap the top of the sections 16 to form an eave 21.

Turning to the form shown in Figure 2, it will be noted that the sections increase in height towards the top but they are of the same thickness. In this form also the interior foraminous wall has been removed for the purpose of clarity. The sections may be made of any number of segments. This exterior wall may be corrugated for reinforcing purposes, as in Figure 3, with the corrugated ribs 22, as in Figure 4, having broad outer faces 23 and converging side walls 24 which may be employed so that a space 25 of relatively narrow character compared to the face 23 is left between the annular plates 26 comprising the side wall of the sheet.

In Figure 5 the reverse is true in which the face 23 is narrower than the face 25. In Figure 6 the rib is V-shaped having two faces 24 meeting in a rib or edge 27.

By using this reinforcing rib construction, a much thinner gauged metal sheet may be employed at the same time not sacrificing the load-carrying value and rigidity to lateral thrust of the construction.

The inner foraminous wall is provided with similar ribs, as indicated in Figures 12, 13, 14, 15, 16 and 17 but the faces or plates 26 are struck up as at 28 and the lips thus struck up are parted to form a slot 29 through which air circulates from between the space 30 between the outside continuous wall and the inside foraminous wall. This space 30 is supplied through the self-cleaning passageway 31 which is inclined thus preventing the lodgement of particles of hay, etc. in the foundation with air from the plenum chamber 3 which may or may not be supplied by air under pressure. The foraminous walls are used for the partition walls and for lining the outside wall in the form shown in Figure 7.

The air passes upwardly through the openings 29 and thence through the body of hay. The columns 3a may be employed to support at spaced intervals the floor 4. Adjacent these columns are air openings 32 communicating with air spaces 33 between spaced foraminous walls that serve as a dividing structure between the annular bodies of hay, it being the intent and purpose to supply a container in which the thickness of the hay bodies shall never be greater than that which will permit of the complete circulation of air through the entire body of hay, thence upwardly into the space beneath the roof.

These spaced foraminous walls form the passageways 33 and are spaced from one another by vertical U-shaped channel members 34 which are bolted to one another as at 35. Where necessary, a plate 36 is welded to the upper end and lower end of adjacent channel members so that they may be connected together. Spacer members 37 and 38 are connected in superposed relation by bolts 39. These members when bolted together are spaced circumferentially from the channel members 34 and serve to additionally space the inner and outer walls as do the members 34. On either side of the spacer members are U-shaped girts. The inner girt is designated 40 and the outer girt 41. Each of them contains wooden fillers 42 to which are bolted or nailed the respective inner foraminous and outer continuous walls heretofore described as through the holes 43.

In the case of the spaced foraminous walls on the interior of the container the same arrangement is provided. There are a series of longitudinally disposed spacers or girts associated with the vertical load-carrying studding 34.

The wooden strip 42 is connected in Figures 29 and 30 by notching the wooden strip at 44 and placing a rod or bolt 45 in the notch which also extends through the flanges of the girt 40. This bolt may be either bolted, threaded or welded as at 46 so that it will remain in position.

Therefore, the vertical members 34 carry the U-shaped girts 40 and 41 while the fillers on the girts carry the inner and outer walls or the spaced foraminous walls.

The foraminous wall may be composed of a perforated sheet having holes 47 as in Figure 19 or composed of a wire netting 48 and spaced connected vertical ribs 49 as in Figures 20, 21 and 23. In that event, the ribs are formed of a pair of ribs 49 and 49a, the flanges of which clamp between them the margins of the netting 48.

Access to the chambers 50, 51 and 52 thus formed within the container may be gained by passing from the corridor 53 through doors 54, 55 or 56 to the respective chambers. The corridors extend from the floor to the top of the container. Such doors are arranged at different elevations so that the hay may be removed at different heights. The center of the chamber 52 is provided with a ventilating tube 57 which comprises a foraminous wall tube of the same character as indicated heretofore for foraminous walls.

It will be understood that I desire to comprehend within my invention such modifications as may be necessary to adapt it to varying conditions and uses.

Having thus fully described my invention, what I claim as new and desire to secure by Letters Patent, is:

1. In combination, an outer continuous wall, an inner foraminous wall, vertically spaced annular horizontal transversely arranged spacing and supporting members for at least one of said walls, and vertical members at spaced intervals for supporting said annular horizontal members, said horizontal members being located between said vertical members and at least one of said walls and spacing at least one of said walls from said vertical members.

2. In combination, an outer ribbed continuous wall, an inner ribbed foraminous wall, vertically spaced annular horizontal spacer members between said walls to which at least one of the walls is attached, and spaced vertical members adapted to support said horizontal spacing members, said vertical members being arranged in sections above and below said annular horizontal members, and means connecting said sections to each other by means of said horizontal annular members, said horizontal members being located between said vertical members and at least one of said walls and spacing at least one of said walls from said vertical members.

3. In combination, a plurality of arcuate sections adapted to form a continuous annular outer wall, similar inner sections having air openings therein forming an inner wall, arcuate annular horizontal members connected to said outer and inner walls to space them and support them, means to connect the inner and outer annular members together and spaced vertical members attached to said annular horizontal members, said annular horizontal members being located between said vertical members and said inner and outer walls.

4. In combination in a container, of a plurality of annular superimposed sections forming the outer continuous wall of the container, a plurality of spaced studding members mounted therein at intervals adjacent thereto, a plurality of interconnecting spaced annular outer and inner girts connected to said studding, means for connecting the outer of the girts to said outer wall, an inner foraminous wall of similar sections as the outer wall connected to the inner girts whereby an air space is provided between the outer and inner walls, said studding members being located between said inner and outer girts, said girts spacing said studding members from said inner and outer walls.

5. In combination in a container, of a plurality of annular superimposed sections forming the outer continuous wall of the container, a plurality of spaced studding mounted therein at intervals adjacent thereto, a plurality of interconnecting spaced annular outer and inner girts connected to said studding, means for connecting the outer of the girts to said outer wall, said outer girt being located between said studding and said outer wall to provide spaces for horizontal and vertical circulation of air, an inner foraminous wall of similar sections as the outer wall connected to the inner girts whereby an air space is provided between the outer and inner walls, a foundation having self cleaning ports in the floor thereof adapted to support said structure and provide an air inlet to the space between said walls and being in communication with certain of said ports, and a plurality of interiorly concentrically disposed spaced foraminous walls communicating with others of said ports in the floor of the foundation for air supply therebetween.

JOHN G. SHODRON.